Aug. 27, 1957　　　　F. A. THOMANN　　　　2,803,938
COTTON PICKER UNIT WITH SPECIFIC HOUSING
Filed Feb. 23, 1955　　　　　　　　　　　　4 Sheets-Sheet 1
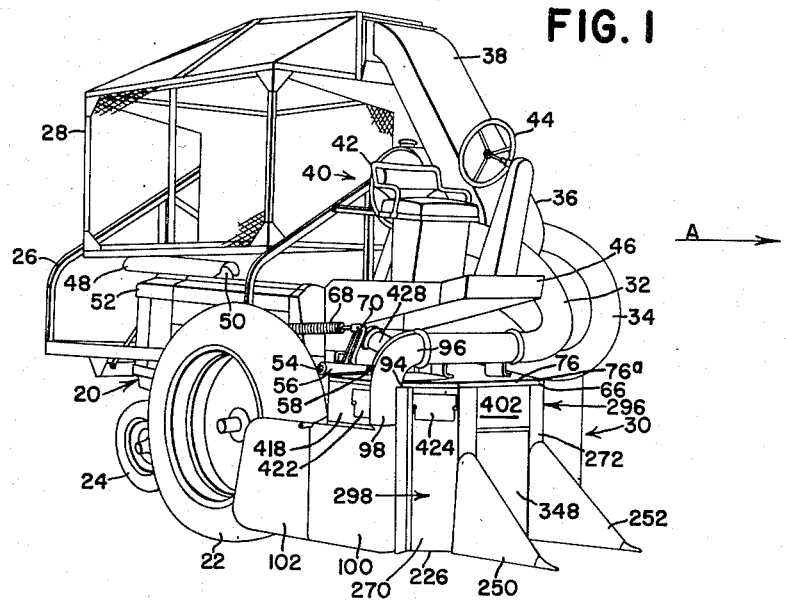
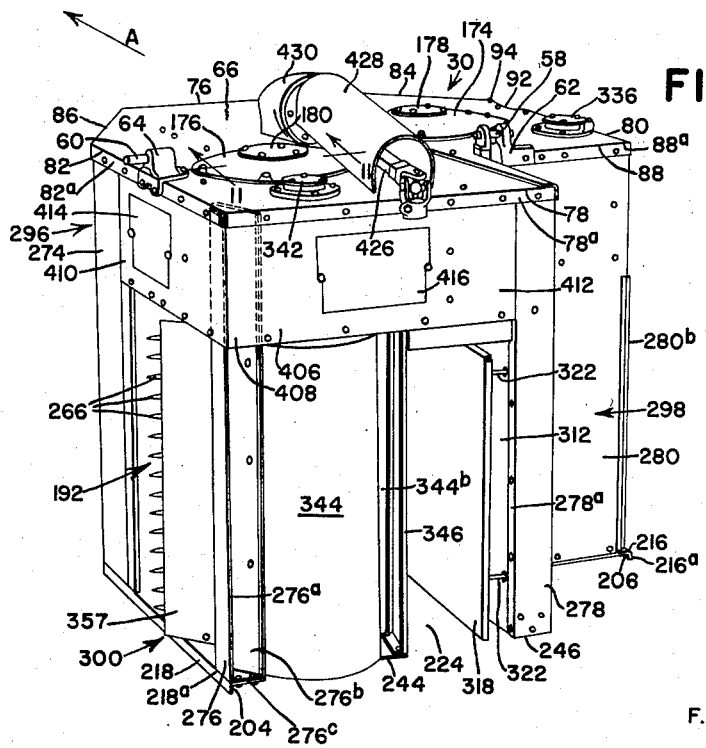
INVENTOR.
F. A. THOMANN Aug. 27, 1957  F. A. THOMANN  2,803,938
COTTON PICKER UNIT WITH SPECIFIC HOUSING
Filed Feb. 23, 1955  4 Sheets-Sheet 2

*INVENTOR.*
F. A. THOMANN

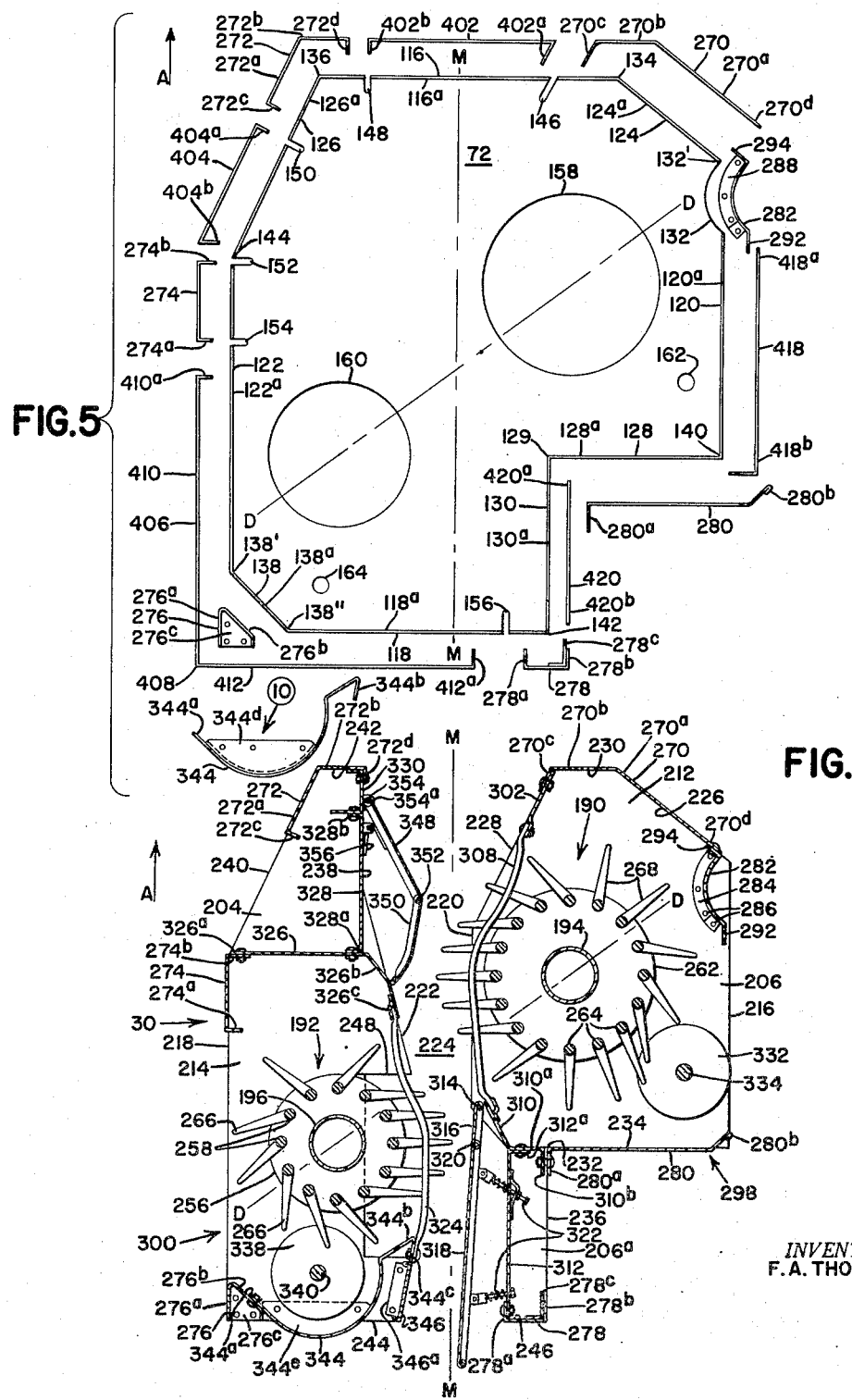

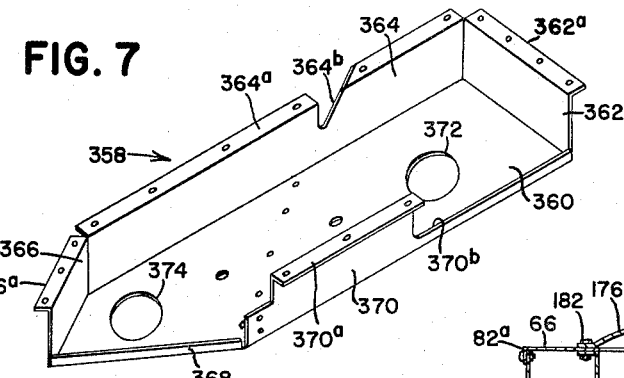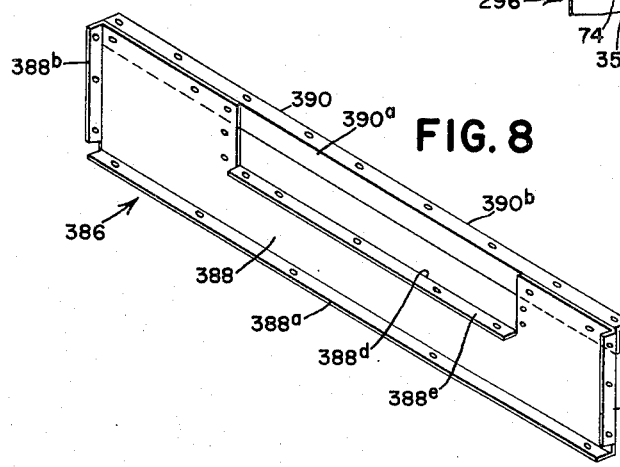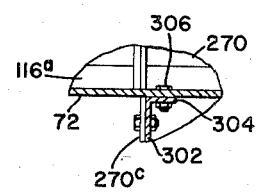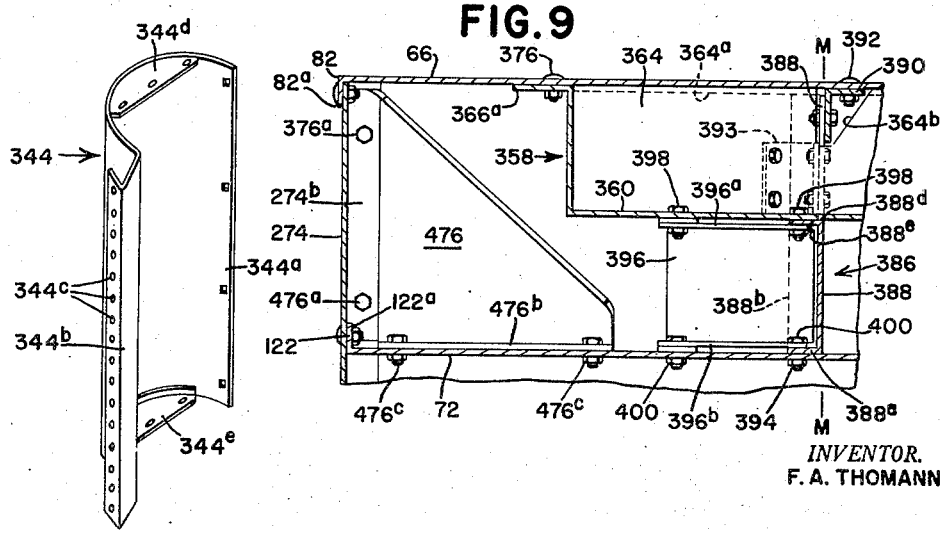

United States Patent Office 2,803,938
Patented Aug. 27, 1957

2,803,938

COTTON PICKER UNIT WITH SPECIFIC HOUSING

Fred A. Thomann, Des Moines, Iowa, assignor to Deere Manufacturing Co., Dubuque, Iowa, a corporation of Iowa Application February 23, 1955, Serial No. 490,034

16 Claims. (Cl. 56—41)

This invention relates to a cotton picker and more particularly to an improved housing for supporting and at least in part enclosing picking mechanism of the two-drum type, each drum having a plurality of generally radiating spindles which project cooperatively across a fore-and-aft plant-receiving passageway as the drums rotate. A typical example of the basic structure is shown in the U. S. patent to Paradise 2,660,852.

In a typical cotton picker of the general character referred to, the housing that supports the picking mechanism is carried by a mobile frame for advance astride a row of cotton plants. There have in the past existed two basic types of housing structures. In one, the main part of the housing comprises an upper section in the form of a relatively heavy and complicated casting from which the two drums are suspended. In another form, the housing is made up of a plurality of frame members and braces in the form of angle irons. The first type is relatively costly because of the nature of the materials used and the second type is relatively weak because of the large number of parts, each of which is comparatively weak structurally and the entire assemblage depending mainly upon the disposition of the frame members and the rigid affixation thereof to each other, all of which complicates the manufacturing and assembling processes.

According to the present invention, these disadvantages are eliminated by the provision of a novel housing made up of sheets and panels arranged to obtain the maximum strength with the lightest weight, certain of the sheets having integral attaching flanges thereon to improve the strength thereof and others having angularly related panel sections to give them sectional shapes of high strength against twisting and bending. The improved housing structure features an upper box-like structure from which depend a pair of secondary box structures, each of which forms a compartment for containing a picking drum and associated mechanism. Certain of the walls that extend vertically between the box-like structures are common to both structures and thus afford high-strength columns that not only integrally join the box-like structures together but afford considerable resistance to relative lateral displacement of the lower structures caused by outward pressures exerted by the plants received between the two structures. The housing structure further includes as a feature thereof an interior box-like element within the upper compartment, which element serves not only to strengthen the upper structure against bending about a fore-and-aft axis but also carries component parts of the picking mechanisms. In this respect, each picking mechanism includes a relatively heavy member secured to the bottom of the interior box-like element and these members reenforce the sheet-like structure affording the bottom of said element. A fore-and-aft extending rib is arranged in an upright longitudinal plane between the bottom of the upper structure and the bottom of the interior element and affords resistance to twisting about a transverse axis as well as preventing bending of the interior box-like element and associated structure along a longitudinal or fore-and-aft line. It is a general object of the invention to provide an extremely economical picker housing, having relatively few parts and parts that are easily assembled and disassembled, certain of the wall sections or panels being removable to afford access to the interior of the structure.

The foregoing and other important objects and desirable features inherent in and encompassed by the invention will become apparent as a preferred embodiment of the invention is disclosed in detail in the following specification and accompanying sheets of drawings, the several figures of which will be described immediately below.

Fig. 1 is a perspective view showing the front and right-hand portion of a self-propelled cotton picker embodying the improved housing construction.

Fig. 2 is a perspective view, on a scale enlarged over that of Fig. 1 and showing the rear and left-hand portions of the improved housing.

Fig. 5 is a plan view of the intermediate sheet, with the various side walls or sheets shown in outwardly spaced relation to the intermediate sheet in the positions they would occupy just prior to assembly.

Fig. 6 is a sectional view as seen along the line 6—6 of Fig. 4, the section being taken just below the intermediate sheet.

Fig. 7 is a perspective view of the intermediate supporting pan.

Fig. 8 is a perspective view of the fore-and-aft rib sheet.

Fig. 9 is a fragmentary sectional view, on an enlarged scale, as seen substantially along the line 9—9 of Fig. 3.

Fig. 10 is a perspective view, on an enlarged scale, of one of the rear upright wall elements as seen in the direction of and designating the wall element indicated by the encircled numeral 10 in Fig. 5.

Fig. 11 is a fragmentary sectional view as seen substantially along the line 11—11 of Fig. 2.

Fig. 12 is a fragmentary sectional view illustrating a typical connection of a lower box element to the intermediate sheet.

Figure 3:
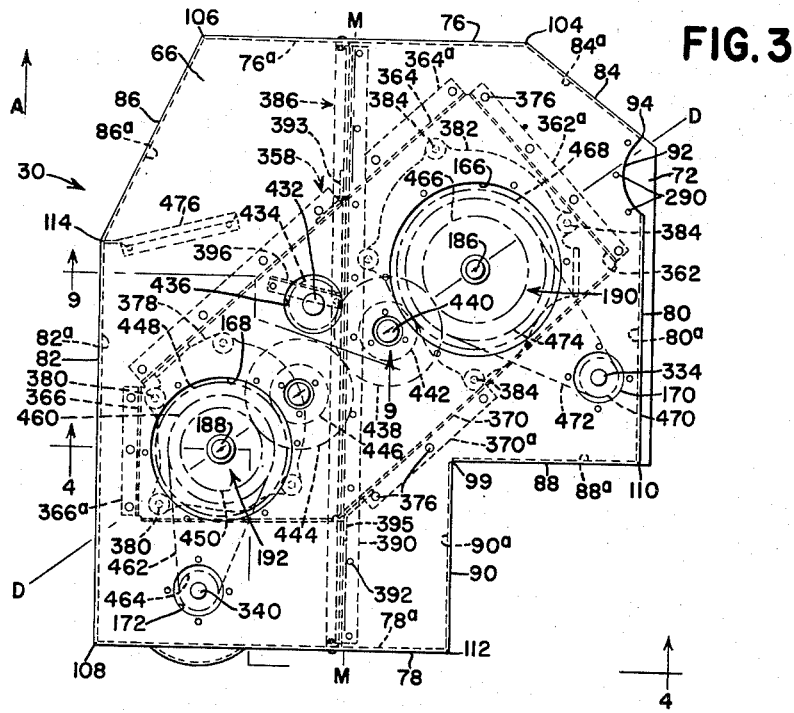
Fig. 3 is a plan view of the housing, with certain cover and drive portions omitted.

The cotton picker shown in Fig. 1 as typical of a self-propelled machine comprises a conventional agricultural tractor having a main body 20 which affords a mobile frame for the machine. This body is carried on traction wheels, only one of which is shown at 22, and a steerable truck 24, the tractor in this instance being driven in a reverse direction so that the cotton picker normally travels in the direction of the arrow A, advancing, as is conventional, over a field of row-planted cotton. The tractor body 20 carries additional frame structure 26 on which is mounted a cotton receptacle 28 for receiving picked cotton from a forwardly located housing structure 30, in which is located picking mechanism (to be described later) which operates astride cotton plants in the particular row along which the machine is advancing. Picked cotton is conveyed from the housing 30 to the receptacle or basket 28 by pneumatic conveying means including conduits 32 and 34, a blower 36 into which the conduits lead in common, and a discharge conduit 38 which leads from the blower 36 to the basket 28. The usual operator's station on the tractor is either replaced with or supplemented by an operator's station 40 including a seat 42, a steering wheel 44, and additional controls, not shown, all of which are mounted on an operator's platform 46. The foregoing construction may be taken as representative of conventional design, at least to the extent that details thereof are immaterial here, no novelty being claimed in the over-all arrangement in this case.

The numeral 48 in Fig. 1 designates a horizontal fore-and-aft extending arcuate shield over the exhaust pipe 50 of the engine (not shown) of the tractor, which arrangement is necessitated because of the proximity of the floor of the basket 28 to the top of the tractor hood 52. Again, the details are immaterial but are described briefly merely because they are illustrated in the environmental design.

Visible at 54 in Fig. 1 is one end of a transverse rockshaft which is carried by the tractor frame and to which is affixed right- and left-hand forwardly extending supporting arms, only the right-hand one of which is visible at 56. The expressions "right" and "left" are used with reference to the position of an observer standing behind the machine and looking forwardly or in the direction of the arrow A. Since the details of the mounting of the rockshaft 54 on the tractor are not important here, it is deemed sufficient to describe the rockshaft as having suitable bearing support on the tractor in such manner that the arm 56 and the other arm like it (not shown) extend forwardly in cantilever fashion to have their forward ends pivotally connected at 58 and 60 to right- and left-hand pivot blocks 62 and 64 respectively secured rigidly to a horizontal one-piece rigid top sheet or plate 66 of the housing 30. The housing is counterbalanced about its rockshaft support by means of a counterbalancing spring 68 which has one end (not shown) anchored to the tractor and its other end connected to a counterbalance arm 70 on the rockshaft 54.

The housing 30 includes, in addition to the top sheet 66, an intermediate or second sheet 72 which is spaced below and substantially congruent with the top sheet, the space between the sheets 66 and 72 affording a relatively wide horizontal compartment 74. The top sheet, as best seen in Fig. 3, has a transverse front edge 76, a transverse rear edge 78, and opposite fore-and-aft outer side edges 80 and 82, the latter being respectively right-hand and left-hand edges. The top sheet includes secondary edge portions, such as a right-hand oblique edge 84, a left-hand front oblique edge 86, and angularly related edges 88 and 90, which afford the boundaries of a notch at the right-hand rear corner of the top sheet. The right-hand side edge 80 is arcuately indented at 92 and the arcuate indentation adjoins the edge 84 at a corner 94. The purpose of the indentation is to accommodate an upright part of an elbow 96 which forms part of the cotton-conveying conduit 32, the upright part of the elbow being designated by the numeral 98 in Fig. 1 and being shown in association with a removable door 100, which door is omitted from the other views in the interests of clarity. As shown in Fig. 1, the housing has a rearward extension 102 which serves as an outer shield for the traction wheel 22.

The transverse front edge 76 of the top sheet 66 adjoins the oblique edge 84 at a corner 104 and adjoins the oblique edge 86 at a corner 106. The rear edge 78 and side edge 82 adjoin at a left-hand rear corner 108. The edges 80 and 88 adjoin to form a corner 110 and another corner 112 is afforded by the junction of the rear edge 78 and the fore-and-aft secondary edge 90.

It is a feature of the invention that the top sheet 66 is of relatively lightweight sheet metal construction and for the purpose of achieving increased strength, it has a peripheral flange following the edges previously described, this flange, for convenience, being designated in sections according to the respective edges as at 76a, 78a, 80a, 82a, 84a, 86a, 88a, and 90a. The edges 82 and 86 adjoin at a corner 114.

The one-piece nature of the top sheet 66 gives it a transverse expanse as well as a fore-and-aft expanse consistent with the extreme dimensions of the housing 30 as a unit and, for all practical purposes, the second or intermediate sheet 72 is therefore congruent with the top sheet 66, and both of these sheets have slightly unequal portions lying respectively at opposite sides of a fore-and-aft upright median plane M—M. In other words, the median plane M—M is not exactly centered between the side edges 80 and 82 of the top sheet but this is due to the difference in sizes of the picking mechanisms (to be described below) rather than to any structural peculiarity of the housing. In its broader aspects, the housing may be considered as being symmetrical at each side of the median plane.

The intermediate sheet 72 being substantially congruent with the top sheet 66, likewise has edges corresponding to those of the top sheet. Hence, the second or intermediate sheet has front and rear edges 116 and 118, respectively (Fig. 5), right- and left-hand fore-and-aft outer side edges 120 and 122, and secondary edges 124, 126, 128, and 130. The intermediate sheet is arcuately indented at 132 and the various edges effect corners or junctions at 134, 136, 138, 140, 142, and 144, the arcuate indentation 132 meeting the edge 124 at a corner 132' and the corner 138 differing from the corresponding corner 108 of the top sheet 66 in that the former is cut off or diagonally disposed to afford secondary corners 138' and 138". The edges 128 and 130 meet at an inside corner 129 which, when the sheets are assembled, is in vertical alinement with an inside corner 99 of the top sheet 66.

The intermediate sheet 72, like the top sheet 66, is marginally flanged to increase its strength and rigidity, but in the case of the sheet 72 the marginal flange is directed upwardly, following the edges previously described. These flanges will be designated in terms of their edges and are therefore identified as flange portions 116a, 118a, 120a, 122a, 124a, 126a, 128a and 130a, it being noted also that the corner 138 has a flange 138a thereon.

Part of the peripheral portion or marginal edge of the sheet 72 is provided with inwardly directed notches, which notches of course interrupt the associated flanges. These notches are designated by the numerals 146, 148, 150, 152, 154, and 156, the exact locations of which will be clear from an examination of Fig. 5.

The intermediate sheet is further provided with first and second or right- and left-hand relatively large circular openings 158 and 160, respectively. These openings have their centers alined on a diagonal D—D to the median plane M—M, being thus fore-and-aft offset as well as being laterally offset, for purposes to presently appear. In addition, the sheet 72 has right- and left-hand smaller openings 162 and 164, which will be further described in connection with the functions of the openings 158 and 160.

The large openings 158 and 160 in the sheet 72 are respectively vertically coaxial with relatively large circular openings 166 and 168 in the top sheet 66; and the smaller openings 162 and 164 are respectively vertically coaxial with small circular openings 170 and 172 in the top sheet 66.

As shown in Fig. 2, the openings 166 and 168 are normally closed by top cover plates 174 and 176, which covers are centrally apertured and themselves enclosed respectively by removable bearing caps 178 and 180. A detail of the left-hand arrangement is shown in Fig. 11, wherein it is shown that the cover plate 176 is removably attached to the top sheet 66 over the opening 168 as by cap screws 182. Removable mounting of the bearing cap 180 may be accomplished as by cap screws 184. It will be understood that the arrangement at the right-hand side is the same and on the basis of that assumption the right-hand structure will not be separately described.

The bearing caps 178 and 180 respectively afford bearings or journals for upper portions or shafts 186 and 188, respectively, of right- and left-hand picking mechanisms, designated respectively generally by the numerals 190 and 192. These shafts are coaxially secured respectively to hollow upright lower portions or shafts 194 and 196, the lower end of each hollow shaft being journaled in a manner to be described immediately below.

Figure 4:
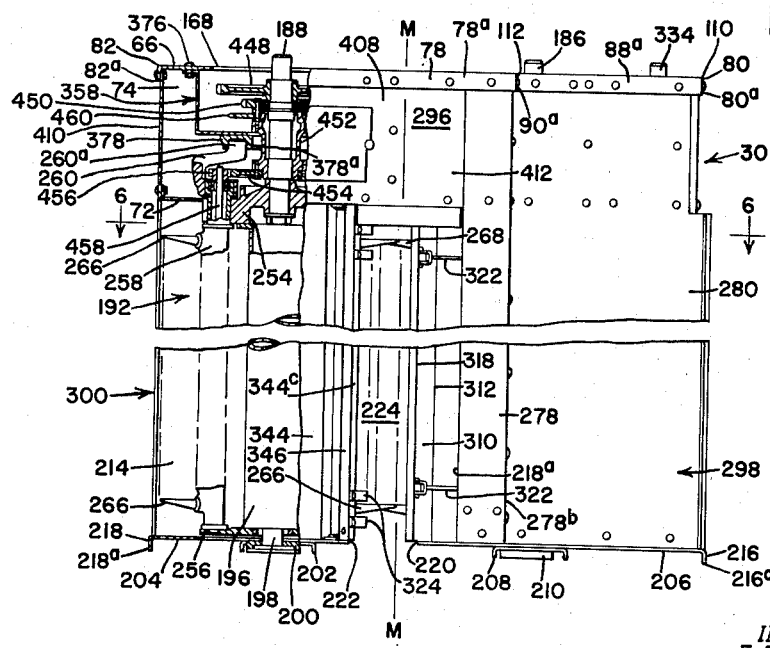
Fig. 4 is a rear view of the housing, partly in section, as seen along the line 4—4 of Fig. 3.

As best shown in Fig. 4, the lower end of the hollow shaft 196 for the left-hand picking mechanism 192 has a coaxial pilot 198 journaled in a bearing 200 supported in a fore-and-aft channel 202 that is rigidly mounted on the underside of a left-hand floor sheet 204. A horizontally coplanar right-hand floor sheet 206 is disposed below the right-hand "half" of the top and intermediate sheets 72 and 76, and visible at 208 and 210 are a channel and a bearing for the lower end of the right-hand picking mechanism hollow shaft 194.

The horizontally coplanar floor sheets 206 and 204 are spaced at a level substantially below the intermediate sheet 72, affording right- and left-hand picking mechanism compartments 212 and 214 respectively for the picking mechanisms 190 and 192. The right-hand floor sheet 206 has an outer marginal side edge 216 in substantial vertical alinement with the outer side edges 80 and 120 of the top and intermediate sheets 66 and 72. The left-hand floor sheet has an outer side edge 218 respectively vertically in alinement with the side edges 82 and 122 of the top and intermediate sheets 66 and 72. The floor sheets respectively have fore-and-aft inner edges 220 and 222 that are spaced apart laterally respectively at opposite sides of the median plane M—M, thereby affording a fore-and-aft plant-receiving passageway 224 centered on the median plane. It follows that the picking mechanism compartments 212 and 214 are divided by the passage 224.

The outer and inner edges 216 and 220, respectively, of the right-hand floor sheet 206 converge forwardly at 226 and 228 to adjoin a transverse front edge 230. The floor sheet 206 has an inside corner 232 afforded by a transverse rear edge portion 234 and a fore-and-aft edge portion 236.

The front portion of the floor sheet 204 is made up of inner and outer converging edges 238 and 240 which terminate in a transverse front edge 242 that is in transverse alignment with the front edge 230 of the right-hand floor sheet 206. The floor sheet 204 terminates at its rear in a transverse rear edge 244 that is transversely alined with a transverse rear edge 246 on the right-hand floor sheet 206. The left-hand floor sheet 204 is notched at 248 but since this notch is not important to a disclosure of the present invention it may, for all practical purposes, be ignored. Thus, except for the plant passageway 224, the floor sheets 204 and 206, when combined, are substantially congruent with the top and intermediate sheets 66 and 72. The increasing width between the edges 228 and 238 of the floor sheets affords a wide entrance to the plant passageway 224, which entrance terminates or is additionally defined by right- and left-hand outer dividers 250 and 252 (Fig. 1). The purpose of dividers such as those shown is well known and need not be described in detail here.

The outer edges 216 and 218 of the floor sheets 206 and 204, respectively, are in the form of downturned flanges 216a and 218a.

Since the left-hand picking mechanism is shown in greater detail than the right-hand picking mechanism, it will be described first. As best seen in Figs. 4 and 6, the picking mechanism 192 comprises upper and lower drum heads 254 and 256 secured to the shaft assembly 188—196, the upper head 254 being accommodated by the opening 160 in the intermediate or second sheet 72 and the lower head 256 running parallel to and just above the floor sheet 204. The drum heads carry between them a plurality of upright picker bars 258, which picker bars oscillate in the drum heads in a well-known manner. These picker bars appear somewhat schematically, but in section, in the left-hand compartment 214 in Fig. 6. As shown in Fig. 4 the upper end of each picker bar 258 projects above the level of the intermediate plate 72 and has secured thereto an operating element in the form of a crank 260, these cranks being annularly arranged about the axis of the shaft assembly 188—196 on the order of the annular arrangement of the picker bars 258, the latter of which will be apparent from Fig. 6. The purpose of the cranks 260 is to effect oscillation of the picker bars 258 in a well-known manner, the relationship of which to the present invention will become subsequently apparent.

Similar but different sized structure exists for the picking mechanism 190 in the right-hand picking mechanism compartment 212. In Fig. 6 there is visible a lower drum head 262 from which rise a plurality of picker bars 264, the upper ends of which picker bars are mounted in an upper drum head (not shown, but similar to the drum head 254) and the upper ends of these picker bars are similarly arranged relative to the intermediate sheet 72, having thereon a plurality of annularly arranged cranks (not shown, but similar to the cranks 260). In view of the substantial identity—or at least symmetry—between the right- and left-hand picking mechanisms, it is deemed that detailed description of one will suffice for both.

As is conventional, and as shown here generally by the numeral 266, each picker bar 258 carries a set of vertically spaced, generally radially extending picker spindles. Similar spindles 268 are arranged on the picker bars 264 for the right-hand picking mechanism 190. As will be familiar to those versed in the art, the spindles 266 and 268 are projected across the plant-receiving passage 224 as the picking mechanisms rotate while the machine advances.

The top sheet 66, intermediate sheet 72, and floor plate structure 204—206 are rigidly interjoined by upright wall structure, to be presently described. This wall structure includes upright elements serving in some cases as columns and in other cases as panels. As will appear, some of these walls extend vertically between the floor sheet structure and the intermediate sheet, some extend between the intermediate and top sheets, and some are full-height elements extending from the floor sheet structure completely to the top sheet.

The upright wall structure, comprising the wall elements to be described below in detail, may best be appreciated from an examination of Fig. 5, wherein the main components of the upright wall structure are shown in preassembled relationship to the intermediate sheet 72. Full-height elements appear at 270, 272, 274, 276, 278, 280, and 282. The element 282 is of arcuate section and fits the arcuate indentations 92 in the top sheet 66 and 132 in the intermediate sheet 72, the bottom of the element 282 being flanged at 284 for rigid affixation to the proximate right-hand forward portion of the right-hand floor sheet 206, attachment being accomplished, as by bolts 286. The upper end of the element 282 is flanged at 288 for affixation to the forward corner of the top sheet, as by bolts 290 (Fig. 3). The arcuate element 282 is also flanged along its upright marginal edges as at 292 and 294 and portions of these flanges are secured to the associated edge flanges 120a and 124a of the intermediate sheet 72, the manner of securement, although not illustrated in detail, being obvious from the general type of fasteners used, for example, at 286 and 290.

The upright member 270, which may be considered a front corner column or post, has angularly related upright wall or panel portions 270a and 270b which, as will be best seen in Figs. 5 and 6, fit the edge portions of the sheets 66 and 72 that border the corners 104 and 134 respectively. The lower portions of the panels 270a and 270b respectively lie against the flanged front corner edges 226 and 230 of the right-hand floor sheet 206. Again, the type of fastener will be obvious without further description.

The panel 270b has thereon an upright marginal edge flange 270c which is received by the notch 146 in the intermediate sheet 72 when the elements are assembled. The rear edge portion of the panel 270a, as along the edge 270d, is juxtaposed relative to the front flange 294 on the upright arcuate element 282, the two portions being secured together to afford a double thickness 270d—294, as will be clear from an examination of Fig. 6. Securing of the two portions together is accomplished by fasteners that are used typically throughout the housing construction.

The upright wall element 272 may be considered a laterally spaced upright column or post in transversely spaced relation to the column or post 270. This column comprises angularly related wall portions or panel sections 272a and 272b, the upright marginal edges of the panels 272a and 272b being respectively flanged as at 272c and 272d, respectively. When the post is assembled at the front corners 106 and 136 of the sheets 66 and 72 and at the front corner of the floor sheet 204 as afforded by the junction of the edges 240 and 242, the flanges 272c and 272d are received respectively by the notches 150 and 148 in the intermediate sheet, lower and intermediate portions of the column or post being secured respectively to the flanged edge portions 240 and 242 of the floor sheet and to the flanges 126a and 116a of the intermediate sheet, the post being secured as well at its upper end to the portions of the flanges 86a and 76a of the top sheet. Typical fasteners are used to accomplish the affixation.

The left-hand intermediate post or column 274 has flanged edges 274a and 274b which are received respectively by the notches 154 and 152 in the intermediate sheet 72. Again, upper, intermediate, and lower portions of the column 274 are secured respectively to the floor sheet 204, the intermediate sheet 72, and the top sheet 66, the flanged portions of these sheets being utilized in the affixation. Fig. 9 is representative of the attachment of the upper and intermediate portions of the columns to the top and intermediate sheets, this figure showing the upper portion of the column 274 secured to the flange 82a of the top sheet and to the upturned flange portion 122a of the intermediate sheet. Although fasteners are shown, they have not been specially designated, since, as already indicated, the fasteners are substantially identical—or may be—throughout the housing structure. It is deemed, therefore, sufficient for the present purposes, that fasteners are illustrated, since the particular type of fastener is immaterial, the only requirement being that they accomplish rigid affixation of the associated components.

The left-hand rear corner post comprised by the upright element 276 has a V-shaped cross section, thus affording angularly related wall portions 276a and 276b. When the post 276 is in place, its wall portion 276b abuts the cut-off corner flange 138a on the intermediate sheet, extending both upwardly and downwardly below the intermediate sheet to have its opposite ends affixed respectively to the top sheet 66 and rear corner of the floor sheet 204. A bottom flange 276c enables affixation to the floor sheet 204 by fasteners typical of the present construction. The upper portion of the wall 276a abuts and is secured to the rear portion of the flange 82a of the top sheet 66.

The right-hand rear corner post 278 is in the form of a channel having upright marginal flanges 278a and 278b, to the latter of which is secured an upright angle 278c. When assembled, the member 278 has its flange 278a received in the intermediate sheet notch 156, upper and lower portions of the member or post being appropriately rigidly secured to the rear portion of the top sheet 66 and to the rear portion of the floor sheet 206, the flange 278b and the angle 278c being also appropriately connected to the three associated sheets 66, 72, and 206.

The column structure afforded by the upright wall or panel 280 has a left-hand or inner flange 280a, which functions in the accomplishment of affixation of the panel to the proximate flanged edge portions of the top sheet 66, intermediate sheet 72, and floor sheet 206. The outturned flange 280b, although not used in the securing of the member 280 to the horizontal sheets, nevertheless affords additional strength to the member.

It will be seen from the description thus far that the three sheet structures 66, 72, and 204–206 are rigidly inter-joined in vertically spaced relationship by the post or column elements 270, 272, 274, 276, 278, and 280. As already indicated, these elements extend the full height between the top sheet and the floor sheet structure, being spaced peripherally around the housing 30 in such manner as to lend the greatest support consistent with the respective sections of the upright elements. These elements, to the extent that they interconnect the top and intermediate sheets 66 and 72 comprise upright wall structure combining with the sheets 66 and 72 to establish a relatively wide upper box 296 in which is afforded the upper compartment 74. These elements also combine to constitute wall structure for the picking mechanism compartments 212 and 214. That is to say, the elements or columns 270, 282, and 280, in the vertical extent of each between the intermediate sheet 72 and the right-hand floor sheet 206, constitute wall structure for a right-hand lower box 298 that affords the right-hand picking mechanism compartment 212.

The same situation exists at the other side of the median plane M—M, the members 274 and 276 extending below the intermediate sheet 72 to the left-hand floor sheet 204 to comprise part of a left-hand box 300 in which is contained the picking mechanism 192 in the compartment 214. Thus, the upper box 296 comprises a rigid supporting structure from which depend the lower boxes 298 and 300, these boxes being spaced apart at their inner sides along the passageway 224.

As described generally above, certain of the elements of the upright wall structure extend only between the intermediate sheet 72 and the respective floor sheets 204 and 206, thus combining with the lower portions of the members or posts 270, 272, 274, 276, 278, 280, and 282 to add additional enclosure members to the upright structures of the lower boxes 298 and 300.

In the case of the right-hand box 298, one of these additional upright members comprises a panel 302 positioned along a portion of the edge 228 of the right-hand floor sheet 206 and rising therefrom to a rigid junction with the proximate portion of the intermediate sheet 72. See Fig. 12, which is typical of the attachment of the lower box upright elements to the intermediate sheet 72. In that figure, the member 302 is shown as having an upper flange 304 secured at 306 to the marginal edge portion of the intermediate sheet 72. The edge 228 of the floor sheet 206 is flanged to provide means for affixation of the lower edge of the member 302. Thus, the member 302 constitutes a short post extending between the floor 206 and the intermediate sheet 72. This post also affords support for a plurality of rearwardly extending, vertically spaced grid bars 308, which bars are vertically interspaced (not shown) with the spindles 268 of the right-hand picking mechanism 190. The relationship of grid bars to spindles is conventional and has therefore not been illustrated in greater detail. The rear ends of the grid bars 308 are affixed to the front edge of a rear post or column 310 which has an angularly related wall 310a and a still further angularly related wall 310b, the latter being secured to the upright flange 280a of the rear full-height element 280. The lower portion of the post or support 310 is appropriately rigidly secured to the associated portion of the right-hand floor sheet 206 and the upper portion thereof may be appropriately flanged and secured to the intermediate sheet 72 in the manner of which Fig. 12 is typical.

As best illustrated in Fig. 6, the right-hand floor sheet 206 has a rearwardly extending tail 206a which lies directly below that portion of the intermediate sheet 72 bordered by the edge 130 and a right-hand portion of the rear edge 118. Secured along the inner edge of the tail 206a is an upright wall 312, the rear end of which is secured to the flange 278a of the upright rear member 278 and the forward portion of which is flanged at 312a. Since the wall elements 278 and 280 are columns and are spaced apart fore-and-aft, and since the members 310 and 312 are rigidly joined thereto as well as to the floor sheet and to the intermediate sheet, the rear portion of the structure is rigidified, again, the housing featuring the use of lightweight materials of relatively high strength.

An upright pivot rod 314 is supported in any appropriate manner between the inner edge of the right-hand floor sheet 206 and the vertically alined portion of the intermediate sheet 72. This pivot rod carries thereon a hinged pressure plate made up of a pair of articulately interconnected sections 316 and 318, the hinge being shown at 320. The pressure plate section 318 is supported on the wall 312 by a plurality of biasing means 322, the general character and function of which are known to those skilled in the art. Accordingly, further description is not required.

The pressure plate sections 316 and 318 are at the right-hand side of the plant-receiving passage 322 and are in transverse opposition to a plurality of vertically spaced, fore-and-aft extending left-hand grid bars 324. These grid bars are vertically interspaced with the spindles 266 of the left-hand picking mechanism 192. The grid bars 324 are supported in the following described manner.

An upright supporting member 326 extends vertically between the front portion of the left-hand floor sheet 204 and the vertically alined portion of the intermediate sheet 72, the transverse disposition of the member 326 being clear from Fig. 6. The outer upright marginal edge of the member 326, as at 326a, is secured to the forward upright flange 274b of the left-hand post 274. The member extends transversely inwardly and has a rearwardly directed oblique portion 326b terminating in a rear edge supporting portion 326c for the front ends of the grid bars 324. The upper and lower edges of the member 326 may be appropriately joined to associated portions of the intermediate sheet 72 and left-hand floor sheet 204. As will be seen, the member 326 forms a front end enclosure for the left-hand picking mechanism box 300.

The wall or member 326 is braced in fore-and-aft relation to the front post 272 by means of a fore-and-aft extending wall 328 which is provided with a rear flange 328a for connection to the wall 326. The forward edge of the wall 328 is flanged at 328b for connection to a channel-shaped post 330 which extends between the front part of the floor sheet 204 and the vertically alined portion of the intermediate sheet 72, being connected as shown to the rearwardly turned flange 272d of the post 272.

The picking mechanisms, when operating, project their spindles across the plant passage 224 to pick cotton from standing plants. The right-hand mechanism 190 rotates in a counterclockwise direction about its upright axis (as seen in Fig. 6); and the left-hand mechanism 192 rotates in a clockwise direction. The spindles of the right-hand mechanism therefore move rearwardly and then to the right to carry the cotton wrapped thereon through right-hand doffing means 332, which means is here shown as representative of any form of conventional doffers which, as is well known, comprise a series of doffing disks fixed coaxially to an upright doffer shaft 334. The lower end of the shaft 334 is journaled in any suitable manner in the right-hand rear corner portion of the right-hand floor sheet 206 and extends upwardly through the openings 162 and 170 in the sheets 72 and 66, having its terminal end carried in a bearing (not shown) contained in a right-hand bearing cap 336 (Fig. 2). Cotton removed by the doffing means 332 from the spindles 268 is moved outwardly into the door 100, the doffer rotating in a counterclockwise direction as seen in Fig. 6. This functional characteristic of the picker is well known and is described, therefore, only briefly here.

The spindles 266 of the left-hand picking mechanism 198 move rearwardly in the passage 224 and then to the left, passing ultimately through doffing means 338 located behind the picking mechanism 192 and supported on an upright doffer shaft 340. The lower end of the shaft 340 is appropriately journaled in a rear portion of the left-hand floor sheet 204 and extends upwardly through the openings 164 and 172 in the sheets 72 and 66 and is journaled in an appropriate bearing (not shown) contained in an upper bearing cap 342 (Fig. 2). The doffer 338 moves in a clockwise direction, as seen in Fig. 6, and the cotton removed thereby from the spindles 266 is thrown outwardly to the left for receipt by a door structure (not shown) similar to the door 100, which left-hand door communicates with the left-hand conveying conduit 34, all in a manner well known and therefore requiring no additional description.

Because of the location of the doffer 338, it is required that it be enclosed at its rear. This enclosure is accomplished by a wall or column of arcuate section, the wall being designated generally by the numeral 344 in the drawings. This element is shown by itself in Fig. 10.

The wall or column element 344 extends vertically between the rear portion of the floor sheet 204 and the vertically alined portion of the intermediate sheet 72. Because of the sectional shape of the element 344, it not only encloses the rear portion of the doffing means 338 but also affords considerable rigidity between the floor and intermediate sheets at the left-hand side of the housing 30. One marginal edge 344a of the element 344 is secured to the wall portion 276b of the left-hand rear corner post 276. The opposite marginal edge of the element 344 is in the form of an integral angle 344b which provides a support at 344c for the rear ends of the grid bars 324. Additional columnar strength at the right-hand rear corner of the left-hand floor sheet 204 is afforded by a channel-shaped post 346 that extends between the floor sheet 204 and the vertically alined portion of the intermediate sheet 72. The post 346 is flanged at its lower end at 346a for affixation to the floor and may be flanged at its upper end for affixation to the intermediate sheet 72 in the manner illustrated generally in Fig. 12. The doffer shield or post element 344 is flanged at its top at 344d (Fig. 5) and at its bottom at 344e (Fig. 6). See, also, Fig. 10. The flanges 344d and 344e provide for the affixation of the doffer shield to the intermediate sheet 72 and to the floor sheet 204. The fasteners used are typical of those used throughout the housing 30.

The forward portions of the right-hand grid bars 308 are opposed by a pair of upright pressure plate sections 348 and 350, hingedly interconnected at 352 on an upright axis. The forward end of the front section 348 is carried on a pivot rod 354 appropriately journaled in brackets 354a on the upright wall or post 330. The rear end of the rear section rides along the adjoining portion of the wall element or panel 326b of the transverse upright wall 326 in the left-hand picking mechanism compartment 214. The pressure plate sections are yieldably opposed by a plurality of torsion springs, one of which is visible at 356.

A deflector sheet 357 is secured to the front face or wall portion 276b of the rear left-hand corner post 276 (Fig. 2). This element serves only a deflecting function and has therefore been omitted from the other figures. As will be clear to those skilled in the art, the deflector serves to facilitate the transfer of doffed cotton from the doffer means 38 to the left-hand door (not shown) which forms part of the conduit 34.

From the description thus far, it will be seen that the lower right-hand box 298 is made up of the following wall structure: 302 and 310 and the upright portions of the elements 270, 280, and 282 that extend between the intermediate sheet 72 and the right-hand floor sheet 206. The inner side of the right-hand lower box 298 is established by the grid bars 308, the compartment thus opening through these grid bars to the plant-receiving passageway 224. In an operative assembly, the open right-hand side of the compartment 212 is closed by the right-hand door 100.

The lower left-hand box 300 affords the compartment 214 by means of the following wall portions: The walls 326, 344, and 326b, plus the portions of the full-height walls 274 and 276 that extend between the intermediate sheet 72 and the left-hand floor sheet 204. The compartment 214 is delineated at its inner or right-hand side by the grid bars 324, being open through these bars to the plant-receiving passageway 224. The open left-hand or outer side of the compartment 214 will be closed by a left-hand door (not shown) similar to the right-hand door 100. Because of the columnar nature of the wall portions, many of which have angularly related upright portions or elements, the entire housing structure has ample strength to maintain its shape and rigidity under all normal field conditions. However, because the housing carries the picking mechanisms 190 and 192 and further carries driving mechanism to be presently described, additional strength is required, and this is afforded by structure to be described immediately below.

As previously described and as illustrated in the left-hand portion of Fig. 4, the picking mechanisms 190 and 192 extend upwardly through the intermediate sheet 72, this sheet having therein the openings 158 and 160 to accommodate the upward projection of the respective mechanisms.

The upper box 296, within which is formed the upper compartment 74, is supplemented by an elongated interior box-like element or supporting pan designated generally by the numeral 358 and shown by itself in Fig. 7. This pan has a bottom 360 which is marginally surrounded by upright flanges or walls 362, 364, 366, 368, and 370. The pan 358 is positioned in the upper compartment with its length diagonal to the median plane or lying on the diagonal D—D (Fig. 3). The height of the pan is such that its bottom 360 is spaced substantially midway between the top sheet 66 and the upper surface of the intermediate sheet 72. The pan has diagonally aligned openings 372 and 374 for respectively accommodating upwardly projecting portions of the picking mechanisms 190 and 192. The pan walls 362, 364, 366, and 370 have upper marginal horizontal flanges 362a, 364a, 366a, and 370a. These flanges are apertured, as clearly visible in Fig. 7, for receiving fasteners, as indicated generally at 376 in Fig. 3, which fasteners rigidly secure the pan to the undersurface of the top sheet 66. The pan 358 thus reenforces the top sheet 66 and compensates for the weight as well as the driving reaction of the picking mechanisms 190 and 192.

The left-hand picking mechanism 192 was previously described as having a plurality of elements or cranks 260 annularly arranged about the axis of the upright shaft 188—196, which annular relationship will be apparent from the annular assembly of the picker bars 258 in Fig. 6. The picker bars 258 travel in a circular orbit as the picking mechanism operates and oscillation is imparted to the picker bars about their individual axes by the cranks 260, which cranks have their upper ends 260a controlled by a reaction member or guide casting 378. This member has in its undersurface a continuous but non-circular groove or cam track 378a in which the upper end portions 260a of the cranks 260 run, all in a manner familiar to those versed in the art and in which respect no novelty is claimed here. However, in view of the nature of the member 378 as a casting and further in view of the fact that this casting is rigidly secured to the bottom 360 of the pan 358 at a plurality of angularly spaced points, as at 380, the member affords a reenforcing characteristic to the pan 358.

A similar result is obtained by a guide element or casting 382 for the right-hand mechanism 190, this casting being secured to the underside of the right-hand portion of the pan bottom 360 at angularly spaced points, as at 384. The details of the relationship between the right-hand cam casting 382 and the right-hand picking mechanism 190 will be apparent on the basis of the symmetry between the two picking mechanisms.

As the housing 30 is carried for advance astride a row of cotton plants, the plants received in the plant passageway 224 are compressed to a width narrower than their natural width. Consequently, there are laterally opposed reaction forces tending to separate the lower boxes 298 and 300. These forces may be reflected in bending of the upper box 296 about a fore-and-aft axis coincident with the median plane M—M. However, as already noted, the upper sheet 66 is reenforced by the diagonal pan 358. To further increase the strength of the upper box and to eliminate the possibility of bending about the axis aforesaid, the upper compartment contains an elongated rib sheet designated generally by the numeral 386 and shown by itself in Fig. 8. This rib comprises an elongated, longitudinally disposed web or sheet 388 and an upper separately mounted, elongated angle 390. The web or sheet is flanged at 388a along its lower marginal edge and is flanged at 388b and 388c respectively at its front and rear upright edges. The web is substantially centrally notched, as at 388d, and the horizontal edge resulting therefrom has a marginal flange 388e. The fore-and-aft disposition of the element or rib sheet 386 means that it intersects with the diagonal pan 358. It is for this purpose that the web 388 is notched at 388d, the flange 388e being rigidly secured to the bottom of the pan.

The lower marginal flange 388a is rigidly secured to the central portion of the intermediate sheet 72 (Fig. 9). The upright angle 390 is secured along one flange 390a thereof to the upper marginal edge portions of the web 388 (Fig. 8) and the horizontal flange 390b of the angle 390 is rigidly secured to the undersurface of the central portion of the top sheet 66, fasteners 392 being used in this location, which fasteners are shown in Fig. 9, as are fasteners 394 for securing the lower flange 388a to the intermediate or central fore-and-aft portion of the intermediate sheet 72. As will be noted from an examination of Fig. 7, the front wall 364 of the pan 358 is notched at 364b and the rear wall 370 is cut out at 370b, these notched portions being in fore-and-aft alinement to accommodate the angle 390. Mounting clips 393 and 395 additionally secure the pan to the longitudinal rib 386, any suitable fasteners being used, such as those used typically throughout the housing structure. The interposition of the rib structure 386 between the bottom of the pan 358 and the intermediate sheet 72, as well as the connection of the rib structure to the top sheet, prevents vertical displacement of the pan, particularly since outer portions of the pan are reenforced by the cam castings 382 and 378. The diagonal disposition of the pan 358 relative to the median plane M—M and the rearward location of the cam casting 378 relative to the cam casting 382 leaves a substantially triangular segment of the pan possibly without adequate support. For this purpose, there is interposed in this segment of the structure a transverse upright brace 396 (Fig. 9) which brace has upper and lower flanged edges 396a and 396b by means of which affixation may be had to the bottom of the pan and to the proximate portion of the intermediate sheet 72 as by fasteners 398 and 400. The general location of the brace 396 is apparent in Fig. 3.

Completion of the enclosure of the compartment 74 afforded in the upper box 296 is effected by a plurality of wall elements and closure plates to be presently described, these all having the characteristic that their vertical height is equal to the vertical distance between the top sheet 66 and intermediate sheet 72.

The first of these plates is a central upper plate or sheet 402 having its opposite ends provided with rearwardly directed flanges 402a and 402b and centrally secured to the front flange 388b of the rib 386. When the sheet 402 is in place, its upper and lower marginal edges are secured respectively to the intermediate flanged portions 76a and 116a of the top and intermediate sheets 66 and 72, respectively. Further than that, the flanges 402a and 402b are received in the notches 146 and 148, it being noted that the flange 402a is received in the notch 146 along with the upper portion of the flange 270c on the right-hand forward corner post 270. The two flanges 402a and 270c afford a double-thickness column and are rigidly joined by typical fasteners, thus increasing the strength of the structure in the vicinity where applied. The same result is effected by the double-thickness and rigid intersecuring relationship between the other flange 402b and the flange 272d on the left-hand front corner post 272, both of which flanges are received in the notch 148 alongside each other.

The double-thickness characteristic of related flanges as just described is obtained substantially throughout the upper box 296, particularly in the assemblage in the box of a left-hand front plate 404 and a left-hand rear corner plate 406. The plate or sheet 404 has front and rear upright marginal flanges 404a and 404b. The front flange is received alongside the flange 272c of the post 272 in the intermediate sheet notch 150. The rear flange 404b is received in the intermediate sheet notch 152 along with the front flange 274b on the intermediate post 274.

The left-hand rear corner plate is of L-shaped construction (Fig. 5) having a left-hand wall 410 and an integral rear wall 412. The front edge of the wall 410 is flanged at 410a for receipt in the notch 154 along with the rear flange 274a of the intermediate post 274. The right-hand end of the rear wall 412 has a marginal flange 412a received in the intermediate sheet notch 156 along with the marginal flange 278a of the post 278. The flanges 412a and 278a are rigidly secured together. Upper and lower portions of the walls or plates are, of course, secured to the proximate flanged portions of the sheets 66 and 72, all of which will be clear from the foregoing description of the mounting of the front central plate 402. The rear flange 388b of the rib 386 is secured to the wall 412. The corner portion 408 of the left-hand corner sheet or plate 406 embraces the upper portion of the left-hand corner post 276, being secured thereto by typical fasteners. Removable cover plates 414 and 416, respectively, close access openings (not shown) in the walls 410 and 412.

A side plate 418 encloses the right-hand portion of the upper box 296, the forward portion of the plate 418, as at 418a, overlapping the flange 292 on the arcuate upright post 282, typical fasteners again being used. The rear marginal edge of the plate 418 is flanged, as at 418b, to overlap with an outer marginal portion of the rear upright plate 280. Upper and lower edges of the plate 418 are secured to the respective flanged portions 80a and 120a of the top and intermediate sheets 66 and 72, the fastening means being characteristic of those previously referred to.

A fore-and-aft rear plate 420 lies along the edges 90 and 130, respectively, of the upper and intermediate sheets 66 and 72 and is secured thereat, respectively, along the flanges 90a and 130a. The forward portion of the plate 420, as at 420a, overlaps with the flange 280 on the upright rear plate 280 and the rear portion 420b of the plate 420 laps with the angle 278c in the right-hand rear post 278. Here again, double-thickness portions are availed of to increase the strength of the components. As best shown in Fig. 1, the plate 418 has a removable cover plate 422, which overlies an access opening (not shown). A similar cover plate 424 is mounted on and over an access opening (not shown) in the upper portion of the front corner post 270.

As previously indicated, the upper compartment 74 contains not only the upper portions of the picking mechanisms 190 and 192 but drive mechanism therefor. This drive mechanism is shown schematically in Fig. 3 and in section (in part) in Fig. 4.

Drive for the picking mechanisms is taken from a conventional source on the tractor by a propeller shaft 426, shielded at 428 and leading to an input housing 430. This housing encloses suitable gearing (not shown) for transmitting power to an upright input shaft 432 (Fig. 3). A gear 434, shown in dot-dash lines as being visible through an opening 436 in the top sheet 66 in Fig. 3, is in constant mesh with a large gear 438 on a parallel upright shaft 440 located just to the right of the shaft 432. Also keyed to the shaft 440 is a smaller gear 442. The gear 438 is in constant mesh with a large gear 444 which is coaxially secured to a smaller gear 446, the latter of which is in constant mesh with a large gear 448 keyed to the upper end of the picking mechanism shaft 188. The large gear 444 is in constant mesh with a small gear 450 coaxial with but rotatable relative to the picking mechanism shaft 188 (Fig. 4). The gear 450 is integral with the upper end of a sleeve 452, at the lower end of which is a gear 454. The gear 454 meshes with individual gears 456 at the upper ends of upright spindle-driving shafts 458. This driving mechanism is typical of that used in conventionally designed cotton pickers and forms no part of the present invention in its details, except to the extent that it is representative of one type of picking mechanism that can be supported in and enclosed in part by the housing structure 30. A sprocket 460, coaxially secured to the sleeve 452, drives a chain 462 which is trained about a sprocket 464 keyed to the upper end of the left-hand doffer shaft 340.

The driving mechanism is substantially symmetrically repeated at the right-hand side of the median plane M—M and constitutes driving means for the right-hand picking mechanism 190. The gear 438, previously described, is in mesh with a gear 466 which corresponds to the gear 450 for the left-hand mechanism. The smaller gear 442 on the shaft 440 meshes with a gear 468 which corresponds to the gear 448 for the left-hand mechanism. The right-hand doffer shaft 334 has keyed to the upper end thereof a sprocket 470 and a chain 472 is trained about this sprocket and about a sprocket 474 rotatable with the gear 466.

As suggested by Fig. 4, all of the driving mechanism with the exception of the spindle-driving gears, such as the gear 454 for the left-hand mechanism, which is repeated for the right-hand mechanism, is contained in the interior of the diagonal supporting pan 358, with the exception of the rearwardly extending portions of the sprocket chains 462 and 472. Since the entire upper compartment 74 is enclosed by the sheet or plate structure previously described, the compartment will be dust free, thus avoiding contamination of the lubricant.

Because of the diagonal disposition of the pan 358 relative to the left-hand front corner of the housing structure, this portion presents a segment of relatively wide area possibly subject to deflection by forces exerted on the housing during operation of the machine. To counteract these forces, a triangular brace 476 is positioned in the upper compartment. As best seen in Fig. 9, this brace is secured by bolts 476a to the double-thickness flange 274b—404b and extends inwardly over the associated portion of the intermediate sheet 72, being flanged along its lower edge at 476b for rigid attachment at 476c to the sheet 72. The substantially opposed relationship of the braces 476 and 396 results in substantial reenforcement of the housing structure in the segment noted.

A summary of the novel housing construction reveals that the three box-like structures 296, 298, and 300 are arranged to form a housing that is U-shaped as viewed from the front or rear (Fig. 4). The compartments 212 and 214 afforded by the lower boxes 298 and 300, respectively, contain the picking mechanisms, and the upper portions of the picking mechanisms are supported by the diagonal pan 358, right- and left-hand portions of which are reenforced by the cam castings 382 and 378 of the respective picking mechanisms. Further than this, the fore-and-aft median plane of the structure carries the longitudinal rib sheet 386 which combines with the pan 358 to eliminate deflection that might otherwise result from the imposition of lateral forces acting outwardly against the lower boxes 298 and 300 as the plants are received in the passageway 224. The additional rigidification afforded to the upper box by brace 396 adequately accomplishes the mounting of the driving mechanism as previously noted and further affords rigid attachment means for the mounting blocks 60 and 62.

Various features of the invention not categorically enumerated herein will undoubtedly occur to those versed in the art as will many modifications and alterations in the preferred embodiment of the invention disclosed, all of which may be achieved without departing from the spirit and scope of the invention.

What is claimed is:

1. A cotton picker housing adapted to be mounted on a supporting frame for advance astride a row of cotton plants, comprising: a one-piece horizontal top sheet having transverse front and rear edges and fore-and-aft outer side edges; a one-piece horizontal intermediate sheet substantially congruent with and spaced below the top sheet and likewise having front and rear and outer side edges; an elongated horizontal box-like supporting pan between said sheets and disposed with its length diagonal to the fore-and-aft median plane of said sheets and within the front and rear and sides of said sheets, said pan having a bottom intermediate said sheets and an upright marginal wall integral with said bottom and rising therefrom to top edges secured to the underside of the top sheet; a fore-and-aft rib sheet in the aforesaid median plane and having front and rear portions of a height equal to the spacing between said sheets and a central portion of a height equal to the spacing between the intermediate sheet and the bottom of said pan, said front and rear portions having top and bottom edges secured respectively to the top and intermediate sheets and said central portion having top and bottom edges secured respectively to the pan bottom and intermediate sheet; a pair of horizontally coplanar floor sheets spaced below the intermediate sheets and respectively having fore-and-aft inner edges spaced apart respectively at opposite sides of said median plane to define a fore-and-aft plant-receiving passageway, said floor sheets together, except for said passageway, being substantially congruent with the intermediate sheet and having front and rear edges and outer side edges; and a plurality of upright wall sheets, some of which extend between and interjoin the floor and intermediate sheets, some of which extend between and interjoin the intermediate and top sheets, and certain of which constitute full-height columns extending between the floor sheets and the top sheets and having top and bottom and intermediate portions joined respectively to the top, floor and intermediate sheets, certain of said wall sheets that interjoin the top and intermediate sheets extending transversely at the front and rear edges thereof and across the median plane and being joined also to the front and rear portions of the rib sheet.

2. A cotton picker housing adapted to be mounted on a supporting frame for advance astride a row of cotton plants, comprising: a one-piece horizontal top sheet having transverse front and rear edges and fore-and-aft outer side edges; a one-piece horizontal intermediate sheet substantially congruent with and spaced below the top sheet and likewise having front and rear and outer side edges; an elongated horizontal box-like supporting pan between said sheets and disposed with its length diagonal to the fore-and-aft median plane of said sheets and within the front and rear and sides of said sheets, said pan having a bottom intermediate said sheets and an upright marginal wall integral with said bottom and rising therefrom to top edges secured to the underside of the top sheet; a fore-and-aft rib sheet in the aforesaid median plane and having front and rear portions of a height equal to the spacing between said sheets and a central portion of a height equal to the spacing between the intermediate sheet and the bottom of said pan, said front and rear portions having top and bottom edges secured respectively to the top and intermediate sheets and said central portion having top and bottom edges secured respectively to the pan bottom and intermediate sheet; a pair of horizontally coplanar floor sheets spaced below the intermediate sheets and respectively having fore-and-aft inner edges spaced apart respectively at opposite sides of said median plane to define a fore-and-aft plant-receiving passageway, said floor sheets together, except for said passageway, being substantially congruent with the intermediate sheet and having front and rear edges and outer side edges; upright wall structure including front, rear and outer side walls at one side of said median plane and forming a first compartment between the intermediate sheet and the floor sheet at said one side of said plane, and front, rear and outer side walls at the other side of said plane and forming a second compartment between the intermediate sheet and the other floor sheet, said compartments respectively having inner sides opening to the plant-receiving passageway; and first and second picking mechanisms carried respectively in the first and second compartments, each mechanism having top and bottom portions supported respectively in the top sheet and in the associated floor sheet, and each mechanism having an intermediate portion supported by the bottom of the supporting pan.

3. A cotton picker housing adapted to be mounted on a supporting frame for advance astride a row of cotton plants, comprising: a one-piece horizontal top sheet having transverse front and rear edges and fore-and-aft outer side edges; a one-piece horizontal intermediate sheet substantially congruent with and spaced below the top sheet and likewise having front and rear and outer side edges; an elongated horizontal box-like supporting pan between said sheets and disposed with its length diagonal to the fore-and-aft median plane of said sheets and within the front and rear and sides of said sheets, said pan having a bottom intermediate said sheets and an upright marginal wall integral with said bottom and rising therefrom to top edges secured to the underside of the top sheet; a fore-and-aft rib sheet in the aforesaid median plane and having front and rear portions of a height equal to the spacing between said sheets and a central portion of a height equal to the spacing between the intermediate sheet and the bottom of said pan, said front and rear portions having top and bottom edges secured respectively to the top and intermediate sheets and said central portion having top and bottom edges secured respectively to the pan bottom and intermediate sheet; a pair of horizontally coplanar floor sheets spaced below the intermediate sheets and respectively having fore-and-aft inner edges spaced apart respectively at opposite sides of said median plane to define a fore-and-aft plant-receiving passageway, said floor sheets together, except for said passageway, being substantially congruent with the intermediate sheet and having front and rear edges and outer side edges; a pair of transversely spaced apart front columns rising respectively from and joined to the front edges of the floor sheets and extending to the top sheet, said columns being joined to said top sheet and also to the intermediate sheet, each column having an upright transverse front wall and an integral upright fore-and-aft side wall, each front and side wall being secured to the associated front and side edges of the sheets.

4. The invention defined in claim 3, in which: each wall of each column has an upright marginal flange directed inwardly, and the associated edges of the intermediate sheet have notches therein to receive said flanges.

5. A cotton picker housing adapted to be mounted on a supporting frame for advance astride a row of cotton plants, comprising: a one-piece horizontal top sheet having transverse front and rear edges and fore-and-aft outer side edges; a one-piece horizontal intermediate sheet substantially congruent with and spaced below the top sheet and likewise having front and rear and outer side edges; a pair of horizontally coplanar floor sheets spaced below the intermediate sheets and respectively having fore-and-aft inner edges spaced apart respectively at opposite sides of an upright fore-and-aft median plane intermediate the outer side edges of the top and intermediate sheets to define a fore-and-aft plant-receiving passageway, said floor sheets together, except for said passageway, being substantially congruent with the intermediate sheet and having front and rear edges and outer side edges; and a plurality of upright walls extending from the floor sheets to the top sheets and secured thereto, each wall being of channel-shaped section and having a relatively wide panel portion bordered by integral inwardly directed marginal flanges, said intermediate sheet having inwardly directed peripheral notches receiving said flanges and said intermediate sheet being secured to said walls.

6. A cotton picker housing adapted to be mounted on a supporting frame for advance astride a row of cotton plants, comprising: a one-piece horizontal top sheet having transverse front and rear edges and fore-and-aft outer side edges; a one-piece horizontal intermediate sheet substantially congruent with and spaced below the top sheet and likewise having front and rear and outer side edges; a pair of horizontally coplanar floor sheets spaced below the intermediate sheets and respectively having fore-and-aft inner edges spaced apart respectively at opposite sides of an upright fore-and-aft median plane intermediate the outer side edges of the top and intermediate sheets to define a fore-and-aft plant-receiving passageway, said floor sheets together, except for said passageway, being substantially congruent with the intermediate sheet and having front and rear edges and outer side edges; and a pair of upright walls secured to and rising from the outer edge of one floor sheet and extending past and secured to the associated edge of the intermediate sheet and to and secured to the associated edge of the top sheet, said walls being spaced apart fore-and-aft to constitute a first, forwardly positioned wall and a second, relatively rearwardly positioned wall, said first wall having a rear upright inwardly directed marginal flange and said second wall having a front upright inwardly directed marginal flange; and an upright filler wall extending vertically between and secured to the top and intermediate sheets and fore-and-aft between said flanges, said filler wall having front and rear upright marginal flanges respectively juxtaposed and secured to the aforesaid flanges and forming therewith double-thickness upright elements, said associated fore-and-aft edge of the intermediate sheet having inwardly directed notches to receive said double-thickness elements.

7. A cotton picker housing adapted to be mounted on and carried by a supporting frame for advance astride a row of cotton plants, comprising: a one-piece horizontal top sheet having transverse front and rear edges provided respectively with depending flanges and fore-and-aft outer side edges provided respectively with depending flanges; a one-piece horizontal intermediate sheet spaced below and substantially congruent with the top sheet and having front, rear and outer side edges provided respectively with upstanding flanges respectively in the vertical planes of the top sheet flanges; an elongated horizontal box-like supporting pan between said sheets and disposed with its length diagonal to the fore-and-aft median plane of said sheets and within the front and rear and sides of said sheets, said pan having a bottom intermediate said sheets and an upright marginal wall integral with said bottom and rising therefrom to top edges secured to the underside of the top sheet; a fore-and-aft rib sheet in the aforesaid median plane and having front and rear portions of a height equal to the spacing between said sheets and a central portion of a height equal to the spacing between the intermediate sheet and the bottom of said pan, said front and rear portions having top and bottom edges secured respectively to the top and intermediate sheets and said central portion having top and bottom edges secured respectively to the pan bottom and intermediate sheet; first and second picking mechanisms located respectively at opposite sides of the median plane and depending from the supporting pan and downwardly below the intermediate sheet, said intermediate sheet having first and second openings therein to respectively accommodate said mechanisms; and first and second compartment structures disposed below the intermediate sheet and respectively housing the picking mechanisms, said compartments respectively having fore-and-aft inner upright portions at opposite sides of the median plane to define a fore-and-aft plant-receiving passageway, each compartment having a horizontal floor sheet and said floor sheets being horizontally coplanar, each compartment having a plurality of upright elements rigidly suspending the respective compartment from the intermediate sheet, certain of said elements extending from the floor sheet of said compartment to the top sheet and having a bottom portion secured to said floor sheet, an intermediate portion secured to the associated flange of the intermediate sheet and a top portion secured to the associated flange of the top sheet.

8. A cotton picker housing adapted to be mounted on a supporting frame for advance astride a row of cotton plants, comprising: a one-piece horizontal top sheet having transverse front and rear edges and fore-and-aft outer side edges; a one-piece horizontal intermediate sheet substantially congruent with and spaced below the top sheet and likewise having front and rear and outer side edges; an elongated horizontal box-like supporting pan between said sheets and disposed with its length transverse to the fore-and-aft median plane of said sheets and within the front and rear and sides of said sheets, said pan having a bottom intermediate said sheets and an upright marginal wall integral with said bottom and rising therefrom to top edges secured to the underside of the top sheet; a fore-and-aft rib sheet in the aforesaid median plane and having top and bottom edges secured respectively to the pan bottom and intermediate sheet; a pair of horizontally coplanar floor sheets spaced below the intermediate sheets and respectively having fore-and-aft inner edges spaced apart respectively at opposite sides of said median plane to define a fore-and-aft plant-receiving passageway, said floor sheets together, except for said passageway, being substantially congruent with the intermediate sheet and having front and rear edges and outer side edges; and upright wall means interjoining the top and intermediate sheets and the floor sheets in vertically spaced relation, certain of said wall means extending transversely across the median plane but having laterally spaced portions respectively alined with the inner edges of the floor sheets to leave said passageway open from front to rear below the intermediate sheet.

9. A cotton picker housing adapted to be mounted on a supporting frame for advance astride a row of cotton plants, comprising: a one-piece horizontal top sheet having transverse front and rear edges and fore-and-aft outer side edges; a one-piece horizontal intermediate sheet substantially congruent with and spaced below the top sheet and likewise having front and rear and outer side edges; an elongated horizontal box-like supporting pan between said sheets and disposed with its length transverse to the fore-and-aft median plane of said sheets and within the front and rear and sides of said sheets, said pan having a bottom intermediate said sheets and an upright marginal wall integral with said bottom and rising therefrom to top edges secured to the underside of the top sheet; a fore-and-aft rib sheet in the aforesaid median plane and having top and bottom edges secured respectively to the pan bottom and intermediate sheet; a pair of horizontally coplanar floor sheets spaced below the intermediate sheets and respectively having fore-and-aft inner edges spaced apart respectively at opposite sides of said median plane to define a fore-and-aft plant-receiving passageway, said floor sheets together, except for said passageway, being substantially congruent with the intermediate sheet and having front and rear edges and outer side edges; upright sheet structure interconnecting the edges of the top, intermediate and floor sheets, said structure including an upright fore-and-aft wall at least one outer side edge of the top sheet, said wall having an upper edge joined to said one outer edge of the top sheet and a second edge spaced below said upper edge and joined to the associated outer side edge of one of the other two sheets; a first transverse brace sheet secured to said wall and extending inwardly between the top and intermediate sheets and secured to the intermediate sheet; and a second transverse brace sheet interposed between the intermediate sheet and the bottom of the pan and secured thereto.

10. A cotton picker housing adapted to be mounted on and carried by a supporting frame for advance astride a row of cotton plants, comprising: an upper box made up of a horizontal top sheet having transverse front and rear edges and laterally spaced apart fore-and-aft side edges, a second sheet spaced below and substantially congruent with the top sheet and having corresponding front, rear and side edges, and upright walls rigidly interconnecting the sheets at their edges to afford an upper relatively wide compartment, said second sheet having first and second openings therein spaced apart laterally at opposite sides of a fore-and-aft median plane between the sides of said box and said openings being also offset fore-and-aft to lie on a horizontal diagonal to said plane; first and second lower boxes depending from and secured to the upper box, below and respectively in vertical alinement with the second sheet openings, said lower boxes respectively affording first and second picking-mechanism compartments spaced apart laterally at opposite sides of the median plane to define a fore-and-aft plant-receiving passageway centered on said plane; first and second picking mechanisms disposed respectively in the first and second picking-mechanism compartments and respectively having upright members respectively vertically alined with and passing through the second sheet openings into the upper compartment, each picking mechanism having in said upper compartment a set of movable elements arranged in annular fashion about the respective upright member; an elongated interior box disposed in the upper compartment with its length on the aforesaid diagonal, said interior box having a sheet-like horizontal bottom spaced above the annular movable elements of the picking mechanisms and further having upright marginal wall portions integral with and rising from said bottom to and rigidly joined to the underside of the top sheet; first and second rigid, horizontal guide members lying on said diagonal and secured to the underside of said bottom and respectively receiving the sets of annular movable elements, said guide members serving also to reenforce said bottom; and a fore-and-aft extending rib in the upper compartment and lying in the median plane and having a bottom edge secured to the second sheet and a top edge portion secured to the bottom of said interior box.

11. A cotton picker housing adapted to be mounted on and carried by a supporting frame for advance astride a row of cotton plants, comprising: an upper box made up of a horizontal top sheet having transverse front and rear edges and laterally spaced apart fore-and-aft side edges, a second sheet spaced below and substantially congruent with the top sheet and having corresponding front, rear and side edges, and upright walls rigidly interconnecting the sheets at their edges to afford an upper relatively wide compartment, said second sheet having first and second openings therein spaced apart laterally at opposite sides of a fore-and-aft median plane between the sides of said box; first and second lower boxes depending from and secured to the upper box, below and respectively in vertical alinement with the second sheet openings, said lower boxes respectively affording first and second picking-mechanism compartments spaced apart laterally at opposite sides of the median plane to define a fore-and-aft plant-receiving passageway centered on said plane; first and second picking mechanisms disposed respectively in the first and second picking-mechanism compartments and respectively having upper portions respectively vertically alined with and passing through the second sheet openings into the upper compartment; an elongated interior box disposed in the upper compartment with its length transverse to the median plane and having a sheet-like horizontal bottom spaced above the intermediate sheet and including first and second bottom portions respectively alined vertically with the portions of the picking mechanisms and further having upper upright marginal wall portions integral with and rising from said bottom to and rigidly joined to the underside of the top sheet; first and second rigid, horizontal members secured respectively to the undersides of said bottom portions of the interior box and respectively receiving the upper portions of the picking mechanisms, said members serving also to reenforce said bottom; and a fore-and-aft extending rib in the upper compartment and lying in the median plane and having a bottom edge secured to the second sheet and a top edge portion secured to the bottom of said interior box.

12. A cotton picker housing adapted to be mounted on a supporting frame for advance astride a row of cotton plants, comprising: a one-piece horizontal top sheet having transverse front and rear edges and fore-and-aft outer side edges; a one-piece horizontal intermediate sheet substantially congruent with and spaced below the top sheet and likewise having front and rear and outer side edges; a pair of horizontally coplanar floor sheets spaced below the intermediate sheet and respectively having fore-and-aft inner edges spaced apart respectively at opposite sides of an upright fore-and-aft median plane intermediate the outer side edges of the top and intermediate sheets to define a fore-and-aft plant-receiving passageway, said floor sheets together, except for said passageway, being substantially congruent with the intermediate sheet and having front and rear edges and outer side edges; a plurality of vertical members including upright columnar walls extending from the floor sheets to the top sheets and secured thereto, each columnar wall having integral angularly relation sections lying in different vertical planes and said intermediate sheet being secured to said columnar walls; and additional members including columnar walls extending between the floor sheets and the intermediate sheet and having integral angularly related portions lying in different vertical planes and secured at opposite upper and lower ends respectively to the intermediate and floor sheets.

13. A cotton picker housing adapted to be mounted on a supporting frame for advancing astride a row of cotton plants, comprising: a horizontal top sheet having transverse front and rear edges and fore-and-aft outer side edges; a horizontal intermediate sheet substantially congruent with and spaced below the top sheet and likewise having front and rear and outer side edges; a pair of horizontally coplanar floor sheets spaced below the intermediate sheets and respectively having fore-and-aft inner edges spaced apart respectively at opposite sides of a median plane of the top and intermediate sheets to define a fore-and-aft plant-receiving passageway, said floor sheets together, except for said passageway, being substantially congruent with the intermediate sheet and having front and rear edges and outer side edges; a plurality of upright fore-and-aft wall sheets and a plurality of upright transverse wall sheets, some of which extend between and interjoin the floor and intermediate sheets, some of which extend between and interjoin the intermediate and top sheets, and certain of which extend between the floor sheets and the top sheets and having top and bottom and intermediate portions joined respectively to the top, floor and intermediate sheets; and certain of said fore-and-aft wall sheets having integral transverse flange portions running vertically intermediate the front and rear of the housing and certain of said transverse wall sheets including integral fore-and-aft flange portions running vertically intermediate opposite sides of the housing.

14. A cotton picker housing adapted to be mounted on a supporting frame for advance astride a row of cotton plants, comprising: a horizontal top sheet having transverse front and rear edges and fore-and-aft outer side edges; a horizontal intermediate sheet substantially congruent with and spaced below the top sheet and likewise having front and rear and outer side edges; upright means rigidly interconnecting said sheets; transverse internal reinforcing means between the top and intermediate sheets; a generally fore-and-aft rib structure disposed intermediate the top and intermediate sheets and having top and bottom portions secured respectively to said top and intermediate sheets, said reinforcing means and rib structure intersecting within the top and intermediate sheets to afford an X-shaped brace system strengthening at least one of said sheets against bending and twisting stresses; a pair of horizontally coplanar floor sheets spaced below the intermediate sheets and respectively having fore-and-aft inner edges spaced apart respectively at opposite sides of a median plane of the top and intermediate sheets to define a fore-and-aft plant-receiving passageway, said floor sheets together, except for said passageway, being substantially congruent with the intermediate sheet and having front and rear edges and outer side edges; and a plurality of upright wall sheets extending between and interjoining the floor and intermediate sheets.

15. A cotton picker housing adapted to be mounted on a supporting frame for advance astride a row of cotton plants, comprising: a relatively light-weight horizontal top sheet having transverse front and rear edges and fore-and-aft outer side edges; a relatively light-weight horizontal intermediate sheet substantially congruent with and spaced below the top sheet and likewise having front and rear and outer side edges; a pair of horizontally coplanar floor sheets spaced below the intermediate sheets and respectively having fore-and-aft inner edges spaced apart respectively at opposite sides of an upright fore-and-aft median plane intermediate the outer side edges of the top and intermediate sheets to define a fore-and-aft plant-receiving passageway, said floor sheets together, except for said passageway, being substantially congruent with the intermediate sheet and having front and rear edges and outer side edges; and a plurality of upright walls extending from the floor sheets to the top sheet and secured thereto and to the intermediate sheet, certain of the walls being so shaped in horizontal section as to include rigidly united wall portions lying out of a common vertical plane and affording columnar means common to the top, intermediate and respective floor sheets.

16. A cotton picker housing adapted to be mounted on and carried by a supporting frame for advance astride a row of cotton plants, comprising: an upper box made up of horizontal upper and lower sheets and upright marginal walls rigidly interconnecting the sheets; first and second lower boxes secured to and depending from the upper box in laterally offset relation respectively at opposite sides of a fore-and-aft median plane of the upper and lower sheets to define a fore-and-aft plant-receiving passageway centered on said plane, each lower box having a floor sheet and upright walls rising from said floor sheet and terminating at and secured to the lower sheet of the upper box; and an elongated horizontal box-like supporting pan between and rigidly connected to at least one of the upper and lower sheets and disposed with its length diagonal to the fore-and-aft median plane for strengthening the upper box against bending.

References Cited in the file of this patent

UNITED STATES PATENTS

| | | |
|---|---|---|
| 2,140,631 | Johnston | Dec. 20, 1938 |
| 2,644,285 | Hulseberg et al. | July 7, 1953 |
| 2,649,677 | Paradise | Aug. 25, 1953 |